United States Patent
Johansson et al.

[11] Patent Number: 5,989,394
[45] Date of Patent: Nov. 23, 1999

[54] PROCESS FOR TREATMENT OF A CONTAMINATED LIQUID

[75] Inventors: Mikael Johansson, Alingsas; Krister Ström; Anders Wernqvist, both of Gothenburg, all of Sweden

[73] Assignee: Kvaerner Pulping AB, Karlstad, Sweden

[21] Appl. No.: 08/860,990

[22] PCT Filed: Feb. 25, 1996

[86] PCT No.: PCT/SE96/00075

§ 371 Date: Jul. 9, 1997

§ 102(e) Date: Jul. 9, 1997

[87] PCT Pub. No.: WO96/23566

PCT Pub. Date: Aug. 8, 1996

[30] Foreign Application Priority Data

Feb. 1, 1995 [SE] Sweden .................................. 9500376

[51] Int. Cl.[6] .................................................. B01D 3/34
[52] U.S. Cl. .......................... 203/34; 159/16.3; 159/47.3; 162/DIG. 8; 203/35; 203/96; 203/97; 203/98
[58] Field of Search .................... 202/174; 159/DIG. 19, 159/16.3, 47.3; 203/15, 4, 96, 97, 50, 98, 34, 35; 162/29, 82, 51, 30.11, DIG. 8; 210/774

[56] References Cited

U.S. PATENT DOCUMENTS

| | | | |
|---|---|---|---|
| 1,854,428 | 4/1932 | Segerfelt | 423/220 |
| 1,942,767 | 1/1934 | Oman et al. | 203/96 |
| 2,962,344 | 11/1960 | Kurmeier | 423/210 |
| 3,028,295 | 4/1962 | Trobeck et al. | 423/243.2 |
| 3,183,145 | 5/1965 | Collins, Jr. | 162/47 |
| 3,311,531 | 3/1967 | Feisch et al. | 162/51 |
| 3,745,063 | 7/1973 | Fisher | 162/15 |
| 3,807,479 | 4/1974 | Brannland et al. | 159/47.3 |
| 3,856,673 | 12/1974 | De La Mata et al. | 423/531 |
| 4,005,060 | 1/1977 | Mannbro | 162/16 |
| 4,383,893 | 5/1983 | Kaibel et al. . | |
| 5,275,701 | 1/1994 | Mazzafro et al. | 159/47.1 |

FOREIGN PATENT DOCUMENTS 0 038 686 A2  10/1981  European Pat. Off. .
41 14 333 A1  11/1992  Germany .

*Primary Examiner*—Virginia Manoharan
*Attorney, Agent, or Firm*—Fasth Law Offices; Rolf Fasth

[57] ABSTRACT

A process for purification treatment of an impure liquid, such as a contaminated condensate, obtained when producing paper or paper pulp. The liquid is introduced intro a stripper device at an admission point (C) and the stripper device is also supplied with an acidifier preferably at a point (D) that is located above the admission point (C) and malodorous gases are driven off from the stripper device.

4 Claims, 1 Drawing Sheet

PROCESS FOR TREATMENT OF A CONTAMINATED LIQUID

TECHNICAL FIELD

The present invention relates to a process for purification treatment of condensate from the production of paper or paper pulp. In this process, the condensate, or other contaminated liquid, undergoes stripping in order to remove impurities and malodorous substances. According to the invention, an acidification takes place in conjunction with the stripping, and this acidification is preferably effected above the point of admission of the condensate, which fact facilitates the driving-off of the undesired impurities.

STATE OF THE ART AND PROBLEMS

Owing to the increasing interest in the environment and our understanding of the ecological cycle which exists in nature, there is a great desire, both among consumers and among producers, to decrease the discharges of pollutants arising from human activities. In recent years, very strenuous efforts have been made to decrease the discharges from our pulp and paper mills, and major advances have indeed been made. The demand of the market for paper which has been bleached without using chlorine has led to alternative bleaching chemicals, such as ozone, persulphuric acid, peracetic acid and hydrogen peroxide, coming into use. A goal for pulp producers is to create "the closed mill", in which discharges are minimized and return of liquid flows to the fibre line, and chemical recovery, are maximized. In order to be able to achieve this, it is advantageous for the bleaching process not to contain elemental chlorine or chlorine dioxide, since, among other reasons, chlorine has a corrosive effect on the equipment and can form toxic compounds if it is combusted in the recovery boiler.

In other respects, returning washing liquid in countercurrent to the fibre stream also places great demands on the purity of the liquid. Some washing stages are more sensitive than others to impurities. For this reason, there is often the need for some form of purification of the different condensates which can be utilized as washing liquid. In this context, a distinction is made between different types of condensate since the latter have different contents of impurities.

When the black liquor is extracted from the digester, the pressure is reduced somewhat and the liquor is flashed, resulting in steam being driven off. The steam is accompanied, for example, by terpenes, methanol and reduced sulphur compounds, which, to a large extent, accompany the steam which condenses after cooling has taken place. In this way, a cooking department condensate is formed from which turpentine is normally separated off in a decanter.

The black liquor is normally concentrated by evaporation in several stages. The units, which are termed effects, are numbered in accordance with the route of steam supply within the plant. Thus, fresh steam is supplied to the first effect and the liquor steam which has been obtained in preceding stages is used as a heat source in the subsequent stages. This is possible owing to the gradual decline in pressure. The heat content which remains in the liquor steam from the final effect is condensed in one or more surface condensers. By means of allowing the liquor steam to condense out step-wise on different heat surfaces in the plant, it is possible to segregate, on the one hand, heavily contaminated condensates, to be purified, in a stripper column, and, on the other hand, very pure condensates which can be used directly in the mill without odour treatment or some other form of purification.

Cooking department condensate and heavily contaminated condensate from the black liquor evaporation is normally conveyed to a steam stripper for purification. A steam stripper usually separates off methanol, ethanol, terpenes and malodorous sulphur compounds (hydrogen sulphide, methylmercaptan, dimethyl sulphide and dimethyl disulphide, etc.) very efficiently. The contaminants which have been separated off are obtained in a concentrated stream which has to be dealt with. It is usually conveyed away and combusted. Condensate which has been treated in a steam stripper often has a very low content of COD. Malodorous compounds which remain in the stripped condensate are, apart from traces of hydrogen sulphide, a number of terpenes such as ocimene, alfapinene, delta-3-carene and decanal. These substances do not smell so badly as the sulphur compounds which are otherwise common in malodorous condensates.

The evaporation condensates which are not so heavily contaminated are often termed "pure condensates". The problem is that they nevertheless contain some malodorous impurities. Recently, several malodorous substances, for example dimethyl trisulphide, 2,3-dimethylphenol, and a variety of trithiolanes and tri-sulphides have been discovered in these condensates in addition to those which were previously known. It is therefore desirable to purify these condensates as well in order to avoid problems, inter alia with the working environment, when closing the kraft mill.

Many studies have been carried out to investigate the problem of contaminated condensates from the pulp industry, and also the problem of contaminated water in general, and many suggestions for solving these problems have indeed been presented. The different methods which exist can be classified into the following groups: phase conversion (e.g. stripping and adsorption with active charcoal), biological treatment, thermal or catalytic oxidation and chemical oxidation. The present invention relates to the group termed phase conversion, or, to be more precise, stripping.

It is known, for example from Tom Burgess, The Basics of Foul Condensate Stripping, 1993 Kraft Recovery Operations Short Course, TAPPI Notes, that the efficiency of stripping is affected by temperature and pH. It is thus an advantage to have a temperature of above 50° C. for stripping with air and of above 70° C. for stripping with steam. The document also states that the pH should be below 7 when stripping with air and that the efficiency of stripping with steam depends on pH in the same way as when stripping with air.

A method has also been disclosed, in EP 521 308, for combined treatment of waste containing ammonia and/or hydrogen sulphide and a sodium hydroxide solution. The NaOH solution is in this case acidified with sulphuric acid to a pH of between 3 and 7 and is then mixed with the waste. The mixture is heated and is conveyed to a stripper column where ammonia and hydrogen sulphide are driven off with steam. The method is adapted for problem situations in the petrochemical processing industry.

However, practical trials involving acidification of condensate going to a stripper column have shown that the resulting driving-off is not as effective in practice as theoretical calculations suggest it should be.

SOLUTION AND ADVANTAGES

The present invention provides a process which improves, in an efficient manner, the treatment of contaminated and malodorous condensate from the paper industry or pulp industry, so that this condensate can, if so desired, be re-used in the pulp production operation.

The process is characterized in that a stripper device is supplied not only with condensate or another impure liquid, but also with an acidifier, preferably at a point situated above the point of admission of the liquid. The theory behind the invention is that acid (acidifier) is not driven off and cannot therefore migrate upwards in the stripper device. In the case where the acid is added at the same point as the impure liquid, this means that no acidification effect is obtained in the upper part of the stripper, that is to say in the fortifyer part where most of the driving-off occurs. In contrast, the pH falls the further down in the stripper one goes. By adding the acidifier in the upper part, the fortifyer part or reflux condenser, this problem is avoided and it is possible to achieve an efficient driving-off of, for example, sulphur compounds and methanol. The acidifier is preferably mixed directly into the liquid reflux from a reflux condenser which is coupled to the top of the stripper device. It is more preferable still for the acidifier to come into contact with outgoing stripper steam, for example in a countercurrent contact device where the acidifier sprinkles down and meets the ascending stripper steam. The acidifier is thereafter mixed, either completely or in part, into the liquid reflux.

It is known, from EP 0 038 686 A2, to add for example $SO_2$ or $SO_3$ to a distillation column at a point above the admission point, whereby carbon dioxide is driven off from the binary mixture of carbon dioxide and hydrogen sulphide. The process differs from the present invention in that it is not malodorous gases which are driven off and also in that the problem to be solved is another one. In the EP document, the degree of malodorous gases (hydrogen sulphide) which are driven off are decreased and the hydrogen sulphide is instead concentrated in the exiting condensate. Thus, the possibility of reusing the condensate as process water in the plant or of discharging it, is excluded. This possibility is a main object with our invention.

Figure 1:
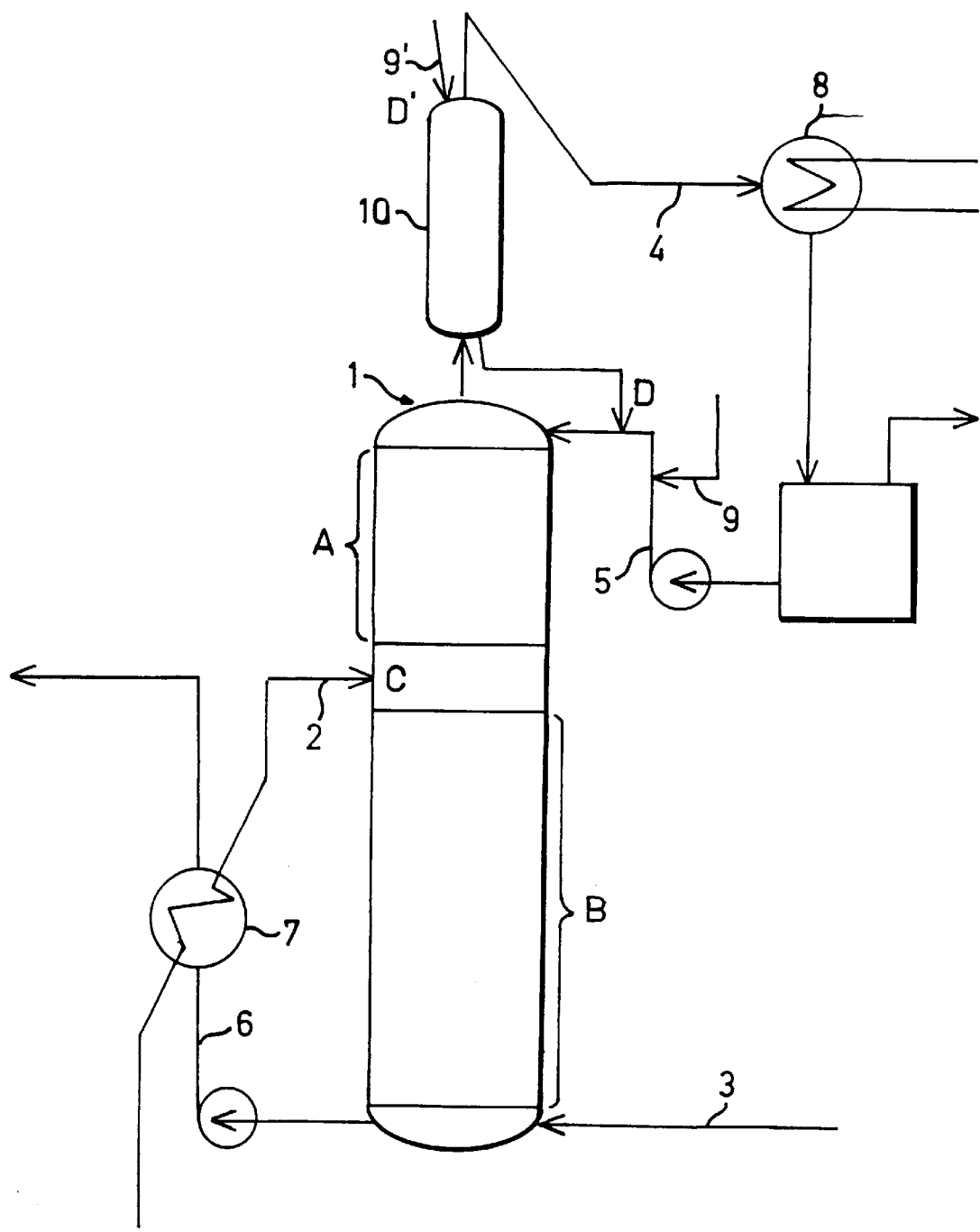
FIG. 1 is a schematic view of a stripper device system of the present invention.

The method will be described below with reference to FIG. 1, which shows a preferred embodiment of the invention.

Feature number 1 in FIG. 1 indicates a stripper device for treatment of condensate or other contaminated liquid. The fortifyer part is called A and the driving-off part is called B. The liquid (2) is introduced between the driving-off part and the fortifyer part at an admission point C. A drop in pressure takes place in conjunction with the liquid being introduced into the stripper. It is advantageous in this case if the incoming liquid has been heated, for example by means of heat exchange (7) with the outgoing, purified liquid (6). Volatile substances then leave more easily. Steam (3) is added to the stripper device at its bottom part, and this steam acts on the impure liquid so that volatile substances are driven off with the outgoing stripper steam (4). In order to achieve an efficient driving-off, it is customary to install a reflux condenser (8) and return some parts (5) of the stripper steam, which has condensed out, to the fortifyer part A. The reflux condenser can be made up of one or more heat exchangers.

According to the invention, an acidification will be carried out by addition of, for example, carbon dioxide, carbon monoxide, phosphoric acid, sulphur dioxide, sulphuric acid, sulphite, bisulphite or effluent from an acid bleaching stage.

The addition point D for the acidifier (9) should in this case be above the admission point C, so that acidification is actually obtained at the point where it is most useful. The acidifier is preferably added to the liquid reflux (5) from the reflux condenser. It is still more preferable for the acidifier to be brought into contact with outgoing stripper steam (4) by addition at the point D', for example in a small countercurrent contact tower (10) (which is not therefore obligatory) where the acidifier sprinkles down and meets the ascending stripper steam. The acidifier is then mixed into the liquid reflux (5), either completely or in part. The acidification is expediently continued to a pH of below 7 in the upper part of the stripper, or even more preferably to a pH of below 6.

The purified liquid (6) can be used, for example, in washing stages which place relatively high demands on purity and freedom from odour, for example lime sludge dilution, lime sludge washing or peroxide-containing bleaching stages.

An advantage of the present process is that since the flow of liquid in the reflux condenser and the fortifyer part is normally considerably less than the flow of incoming condensate, a smaller amount of acidifier is used up if the addition takes place in either one of these parts, compared with the situation if the addition were to take place directly in the condensate or in the lower part of the stripper.

A further advantage of the condensate treatment, over and above the fact that it provides the opportunity of re-using condensate in the operation, thus simplifying matters as the mill becomes increasingly closed, is that the working environment is improved, as well as the environment around the mill. As matters stand at present, people living in the vicinity of the pulp mill can sometimes be greatly inconvenienced by malodorous gases emanating from said pulp mill.

An additional advantage is that it is possible, for example when manufacturing packaging material for food and drinks, to utilize plant condensate in the washing stages on the fibre line without the products acquiring a residual taste or odour.

With the present invention it is possible to purify condensates which, viewed in relative terms, already belong to the purer condensates in a hypothetical pulp mill before they are re-used in the operation, or more contaminated condensates before they are conveyed, for example, to biological purification and discharge, or to the dissolver tank for causticizing.

The invention can of course also be applied to any other process water and also, for example, to effluent from a bleaching stage before it is conveyed further on in the operation.

The process can be applied directly to existing stripper devices, with only minor alterations. Another interesting application is in completely new purification stages for treatment of semi-soiled condensate. It is possible in this case to carry out stripping with a low quotient of steam per kilogram of added condensate, preferably under 0.10 kg/kg, for example 0.03 to 0.04 kg/kg instead of the usual 0.16 to 0.20 kg/kg when stripping cooking department condensate and soiled evaporation condensate. If acidification according to the invention is implemented, larger amounts of hydrogen sulphide present in the condensate can be driven off in controlled forms and conveyed away for destruction. The risk of hydrogen sulphide escaping in the bleaching department, in conjunction with acidification, is therefore much smaller. Otherwise, this can be a problem which arises as the plant becomes increasingly closed.

Although it is preferred to add the acidifier to the upper part of the stripper device, it is possible to contemplate acidifying the condensate directly before the latter is conveyed into the stripper. If appropriate, acidification can already be carried out in association with the condensing-out of the steam which forms the condensate, for example from digester flashing or evaporation.

An alternative addition can be one or more electrolytes. It is already known that by adding electrolyte/electrolytes, the phase equilibrium can be modified in a manner favourable to separation. When adding electrolyte, a distinction is made as to whether the relative volatility of a component increases or decreases. For mixtures of water and alcohol (for example methanol), the relative volatility of the alcohol increases in most cases. When purifying condensate, it is possible to use, for example, $Na^+$ ions, with associated counter-ions as electrolyte.

The invention is not limited to the embodiments which are described here, and can instead be varied within the scope of the patent claims which follow. Thus, the person skilled in the art will readily appreciate that the technology can also be applied to a stripper without fortifyer part, or to a device for stripping with air. The impure liquid can of course be admitted to the stripper device at more than one point. In such a case, it is preferable for the acidifier to be added above the uppermost point, although such an addition can also have a favourable effect if carried out at an intermediate point.

We claim:

1. A process for purification treatment of a contaminated liquid obtained when producing paper or pulp, the process comprising:

producing the contaminated liquid;
   providing an acidifier fluid, a stripper device having an admission point and an acidifier point that is located above the admission point and a liquid reflux and a reflux condenser that is in fluid communication with the stripper device;
   introducing the contaminated liquid into the stripper device at the admission point thereof;
   supplying the acidifier fluid to the liquid reflux;
   supplying the stripper device with the acidifier fluid at the acidifier point; and
   driving off malodorous gases from the stripper device.

2. The process according to claim 1 wherein the process further comprises the steps of bringing the acidifier fluid into contact with a steam provided by the stripper device before the steam is permitted to condense out in the reflux condenser.

3. A process for purification treatment of a contaminated liquid obtained when producing paper or pulp, the process comprising:

producing the contaminated liquid;
   providing an acidifier fluid by selecting a sulfuric acid or an effluent obtained from an acid bleaching stage, a stripper device having an admission point and an acidifier point that is located above the admission point;
   introducing the contaminated liquid into the stripper device at the admission point thereof;
   supplying the stripper device with the acidifier fluid at the acidifier point; and
   driving off malodorous gases from the stripper device.

4. The process according to claim 3 wherein the process further comprises the steps of introducing electrolytes to increase a relative volatility of contaminants included in the malodorous gases that are to be driven off.

* * * * *